(12) United States Patent
Pincek et al.

(10) Patent No.: US 7,455,271 B2
(45) Date of Patent: Nov. 25, 2008

(54) METHOD AND APPARATUS FOR ADJUSTABLY MOUNTING A SPEAKER

(75) Inventors: David Pincek, Huntington Beach, CA (US); Andrew C. Edwards, Anaheim, CA (US); William Cameron Stewart, Jr., Raleigh, NC (US); Xiaozheng Lu, Irvine, CA (US); Stanley S. Coe, Raleigh, NC (US)

(73) Assignee: RGB Systems, Inc., Anaheim, CA (US)

( * ) Notice: Subject to any disclaimer, the term of this patent is extended or adjusted under 35 U.S.C. 154(b) by 197 days.

(21) Appl. No.: 11/161,818

(22) Filed: Aug. 17, 2005

(65) Prior Publication Data

US 2007/0040085 A1 Feb. 22, 2007

(51) Int. Cl.
*A47F 5/00* (2006.01)
(52) U.S. Cl. .......................... 248/288.31; 248/288.51; 248/292.12; 248/220.21; 248/220.22; 248/222.52; 403/76; 403/122; 381/386
(58) Field of Classification Search ............ 248/288.31, 248/288.51, 181.1, 481, 483, 484, 683, 220.21, 248/220.22, 222.52, 323, 324; 403/76, 122, 403/90, 114; 381/87, 332, 386, 394
See application file for complete search history.

(56) References Cited

U.S. PATENT DOCUMENTS

| 5,054,011 | A * | 10/1991 | Alves | 369/12 |
|---|---|---|---|---|
| 5,704,578 | A * | 1/1998 | Fischer | 248/288.51 |
| 6,220,556 | B1 * | 4/2001 | Sohrt et al. | 248/279.1 |
| 6,554,527 | B1 * | 4/2003 | O'Donnell et al. | 403/353 |
| 6,877,709 | B2 * | 4/2005 | March et al. | 248/549 |
| 6,896,436 | B2 * | 5/2005 | McDevitt | 403/123 |
| 6,915,996 | B2 * | 7/2005 | Lin | 248/288.51 |
| 7,000,878 | B2 * | 2/2006 | Lin | 248/276.1 |
| 7,155,027 | B2 * | 12/2006 | Lee | 381/390 |
| 2003/0174855 | A1 * | 9/2003 | Hawkins et al. | 381/386 |
| 2005/0100187 | A1 * | 5/2005 | Yang | 381/386 |
| 2007/0075202 | A1 * | 4/2007 | Gordon | 248/289.11 |

FOREIGN PATENT DOCUMENTS

GB WO 2004027309 * 4/2004
WO WO 2004/027309 A1 4/2004

* cited by examiner

*Primary Examiner*—J. Allen Shriver
*Assistant Examiner*—Todd M. Epps
(74) *Attorney, Agent, or Firm*—The Hecker Law Group, PLC (57) ABSTRACT

A speaker mount includes a support structure attachment, an adjustable mount connected to the structure attachment and including a first connector, and a speaker attachment including a second connector. The first and second connectors may selectively be connected or disconnected, permitting a speaker to be connected to and disconnected from the remainder of the mount. The first connector is mounted to a ball. A lock plate is mounted at an opposing side of the ball from the first connector. A fastener controls the distance between the first connector and the lock plate. In one position, the fastener draws the lock plate and first connector towards one another, fixing the lock plate in a position on the ball, and in another position allows the first connector to be moved relative to the ball. The mount permits orientation of a speaker in a variety of positions relative to a support structure.

21 Claims, 8 Drawing Sheets

METHOD AND APPARATUS FOR ADJUSTABLY MOUNTING A SPEAKER

FIELD OF THE INVENTION

The present invention relates to adjustable mounts for bodies such as loudspeakers.

BACKGROUND OF THE INVENTION

Loudspeakers or "speakers" are used in a variety of settings and locations. Older speaker configurations were commonly "floor" speakers which were configured to set directly upon the floor. A variety of newer speaker designs are smaller and lighter and suitable for mounting to a wall, ceiling or other elevated support surface.

It is desirable to orient speakers in particular directions, such as to optimize sound projection. In the case of floor mounted speakers, the speakers can easily be turned to change the direction they project sound. It is similarly desirable to permit the orientation of a wall or similarly located or mounted speaker to be changed.

One common type of wall speaker mount is a "U" type bracket which mounts to the wall and connects to either side of a speaker. This bracket securely attaches the speaker to the wall, and permits rotation of the speaker. Unfortunately, this mounting only permits the speaker to be moved in one plane or direction—generally up or down about a horizontal axis through swivel pins connecting the mount to the speaker.

Other attempts have been made to wall mount a speaker in a manner permitting movement of the speaker in three-dimensions. These mounting arrangements generally employ a "swivel" type mount. These mounts generally have a number of undesirable drawbacks, however.

For example, U.S. Pat. No. 5,702,578 discloses a ball-type mount for a speaker. This mount allows a greater range of movement of the speaker relative to the support surface than does the above-described bracket type mount. On the other hand, this mount has a very complex design. This design, including location of a variety of moving parts within the speaker enclosure itself, renders the design costly to manufacture and implement, and occupies a great deal of space within the speaker, which compromises the function of the speaker. The design of this mount limits its use with only specially designed speakers and no others.

Another issue is that the adjusting mechanism is dependent solely upon pressure applied by a clamp to a ball. In this configuration, the clamping force is applied through the speaker body itself, and the clamping force may be limited. Moreover, this clamp is the only means by which the speaker is connected to a wall, so that if the ball loosens from the clamp, the speaker can fall from the mount and be damaged or destroyed.

SUMMARY OF THE INVENTION

The invention is a method and apparatus for adjustably mounting a body to a support structure. In one embodiment, the body may be a speaker, and the structure may be a wall or similar surface/support.

In one embodiment, the mount comprises a structure mount, an adjustable support and a body support. The structure mount is configured to be connected to a support structure. In a preferred embodiment, the structure mount comprises a bracket.

The adjustable support preferably includes a ball mounted outwardly of and supported by the structural mount, and a first connector that is integral with a stage that is supported by the ball.

The body support includes a second connector for location at the exterior of the body to be supported, the second connector configured to selectively engage the first connector to connect the body to the adjustable support and support the body from a support structure.

Preferably, the adjustable support includes means for selectively affixing the first connector at various positions on the ball. In one embodiment, the first connector is mounted at a first side of the ball. A lock plate is mounted at an opposing side of the ball. Means are provided for controlling the distance between the lock plate and first connector. In one embodiment, this means comprises at least one fastener configured to selectively draw the lock plate and first connector towards one another. When drawn towards one another, the lock plate and first connector bind or fix to the ball in a particular position. When moved away from one another, the lock plate and first connector may be moved relative to the ball, thus changing their orientation relative thereto.

In one embodiment, the body support comprises a first member configured to be located within an interior of the body. The first member may be a chassis plate configured to be located within the housing of a speaker. The second connector is configured to be mounted to the body support. In one embodiment, one or more fasteners extend between the chassis plate and the second connector, such as through the rear wall of the housing of a speaker.

In accordance with the invention, a body, such as a speaker, may be mounted to a support structure, such as a wall. Further, the orientation of the body relative to the support structure may be adjusted or changed.

In one embodiment, the body may be connected or disconnected from the adjustable support by engaging the second connector with the first connector or disengaging the second connector with the first connector. In this manner, a speaker may be connected to or disconnected from the remainder of the mount. In one embodiment, a secure lock ensures that the body is not undesirably disconnected from the mount. In one embodiment, an opening is provided at the top of the second connector as a reliable connect point for a seismic tether as required by law for public buildings in some states.

The position of the body may be changed by changing the position of the first connector. In one embodiment, a tool may be passed through a passage in the body and various of the components of the mount into engagement with the fastener, thus permitting access to the fastener from the front of the body.

The mount of the invention has numerous advantages and features, including a simple design, a convenient and accessible mounting and adjustment configuration, and configuration ensuring stable and secure mounting of the body to a structure in desired position.

Further objects, features, and advantages of the present invention over the prior art will become apparent from the detailed description of the drawings which follows, when considered with the attached figures.

DETAILED DESCRIPTION OF THE INVENTION

The invention comprises a method and apparatus for adjustably mounting body, such as a speaker, to a support structure. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the invention is an adjustable mount. The mount is configured to connect or support a body from a support structure such as a wall or post. The mount is configured to permit the supported or connected body to be positioned in a variety of orientations.

The mount has particular applicability to supporting a speaker, and as such the mount is referred to herein as a speaker mount, though it will be understood that the mount and method have other applicability and thus the descriptor "speaker," such as used in the term "speaker mount," is not intended to be limiting.

One embodiment of a speaker mount 20 will be described with reference to FIGS. 1 and 2. As illustrated, the speaker mount 20 generally comprises a support structure mount 22, an adjustable support 24, and a body support 26. The support structure mount 22 is preferably configured to connect to a support structure or surface. The body support 26 is configured to support a speaker or other body, and the adjustable support 24 is configured to provide an adjustable connection between the body support 26 and associated speaker/body and the support structure mount 22.

In one embodiment, the support structure mount 22 comprises a bracket 28. The bracket 28 is configured to be connected to a support structure or surface. As detailed below, the particular support structure may vary, and may comprise for example, a wall, post or the like. Preferably, the bracket 28 is configured to be mounted in a vertical or generally vertical position, and thus is desirably mounted to the vertically extending surface of a wall or other structure.

Figure 3A:
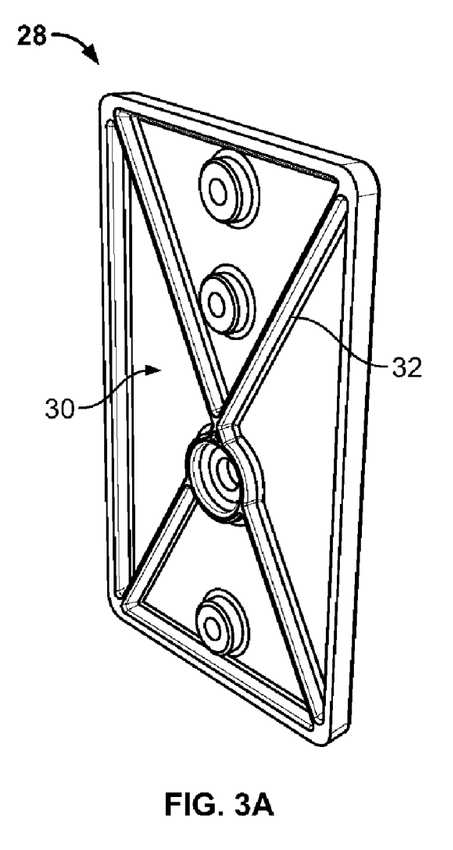
FIGS. 3A and 3B illustrate a bracket of a speaker mount in accordance with one embodiment of the invention.
Figure 3B:
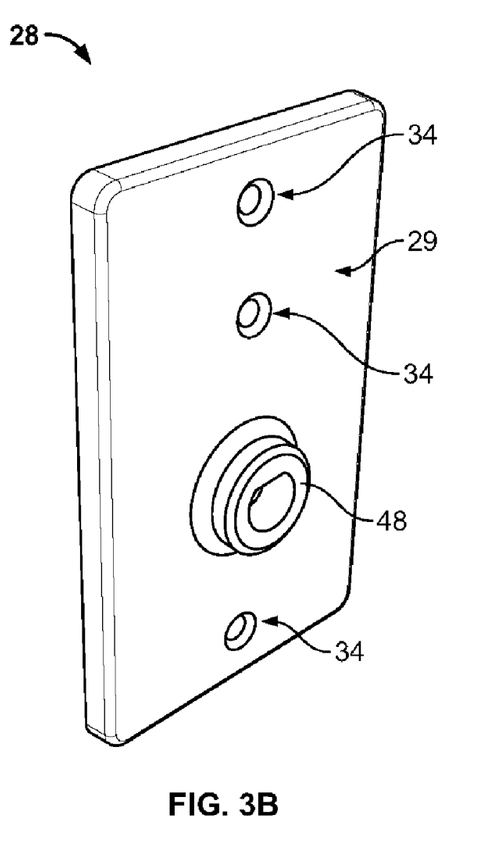

In one embodiment, as best illustrated in FIGS. 3A and 3B, the bracket 28 is a generally planar plate having a front surface or face 29 and a rear surface or face 30. The bracket 28 may be a variety of shapes, such as the generally rectangular shape illustrated. The bracket 28 is configured as a load bearing member, and is thus preferably constructed to be strong and durable. The bracket 28 may be constructed from metal. As illustrated, the bracket 28 may include ribbing 32 or similar structure members to increase the strength of the member while reducing the overall weight and material content of the member. In one embodiment, the bracket 28 may include one or more apertures configured to allow the electrical wires that connect to the speaker to be passed there through.

As detailed below, in use the bracket 28 is configured for mounting to a support. In one embodiment, the bracket 28 includes one or more apertures 34 there through. As illustrated, the bracket 28 includes a set of apertures 34 which are aligned along a vertical axis through the bracket 28. As detailed below, fasteners such as screws may be passed through the apertures 34 into engagement with a support in order to connect the bracket 28 to the support structure.

At least the front surface 29 of the bracket 28 presents a pleasing exterior appearance, as it is visible when mounted. Thus, the front surface 29 may be relatively smooth or be marked with a regular design or pattern. The front surface 29 may also be painted or otherwise colored.

Referring again to FIGS. 1 and 2, the adjustable support 24 is configured to connect a speaker or other body to the support structure mount 22, and thus a support or support surface such as a wall. In a preferred embodiment, the adjustable support 24 permits the position of the speaker to be adjusted relative to the support structure mount 22, and thus the support structure/surface.

In one embodiment, the adjustable support 24 comprises a swivel adjustably supporting a first connector, and means for selectively locking the first connector to the swivel to fix it in position. In a preferred embodiment, the swivel comprises a shaft 42 and a ball 44. The shaft 42 has a first end and a second end. In one embodiment, the shaft 42 is generally cylindrical or rod-shaped, though it may be of other shapes, including having a square or rectangular cross-sectional shape.

One end of the shaft 42 is connected to the bracket 28. In one embodiment, as illustrated, a threaded fastener 46 (see FIG. 2) extends from the rear surface of the bracket 28 there through into engagement with the first end of the shaft 42. The first end of the shaft 42 might also connect the bracket 28 by direct threading or via other means. In one embodiment, as illustrated in FIGS. 2 and 3B, the bracket 28 may include a shaft mount 48. The shaft mount 48 may comprise a support structure extending from the front face 29 of the bracket 28 for accepting the first end of the shaft 42. When the shaft 42 is cylindrical in shape, the shaft mount 28 may comprise a cylinder shape extension for accepting a portion of the end of the shaft 42 therein. In a preferred embodiment, the end of the shaft 42 that engages the ball 44 is knurled to provide a secure mechanical connection with the ball 44.

Referring again to FIGS. 1 and 2, in the preferred embodiment, the shaft 42 extends outwardly from the bracket 28 generally perpendicular to the front surface of the bracket 28. Where the front surface of the bracket 28 is irregular in shape/elevation, the shaft 42 is preferably oriented so that it extends perpendicular to a support structure/surface when the bracket 28 is connected thereto.

The ball 44 is mounted at the opposing, second end of the shaft 42. In one embodiment, the ball 44 is generally spherical in shape. As illustrated, the ball 44 may have an aperture for accepting the second end of the shaft 42. The ball 44 is preferably securely mounted to the shaft 42, such as by attachment with one or more fasteners, by direct threading engagement, by press-fit frictional engagement, by chemical or other bonding, such as by welding, or in a preferred embodiment of insert casting the ball 44 around the knurled end of the shaft 42.

In a preferred embodiment, the first connector comprises a stage 40. Means for selectively locking the stage 40 comprises a lock plate 38. The lock plate 38 and stage 40 are preferably located on opposite sides of the ball 44 with the shaft 42 extending through the aperture 54 of the lock plate 38.

Figure 1:
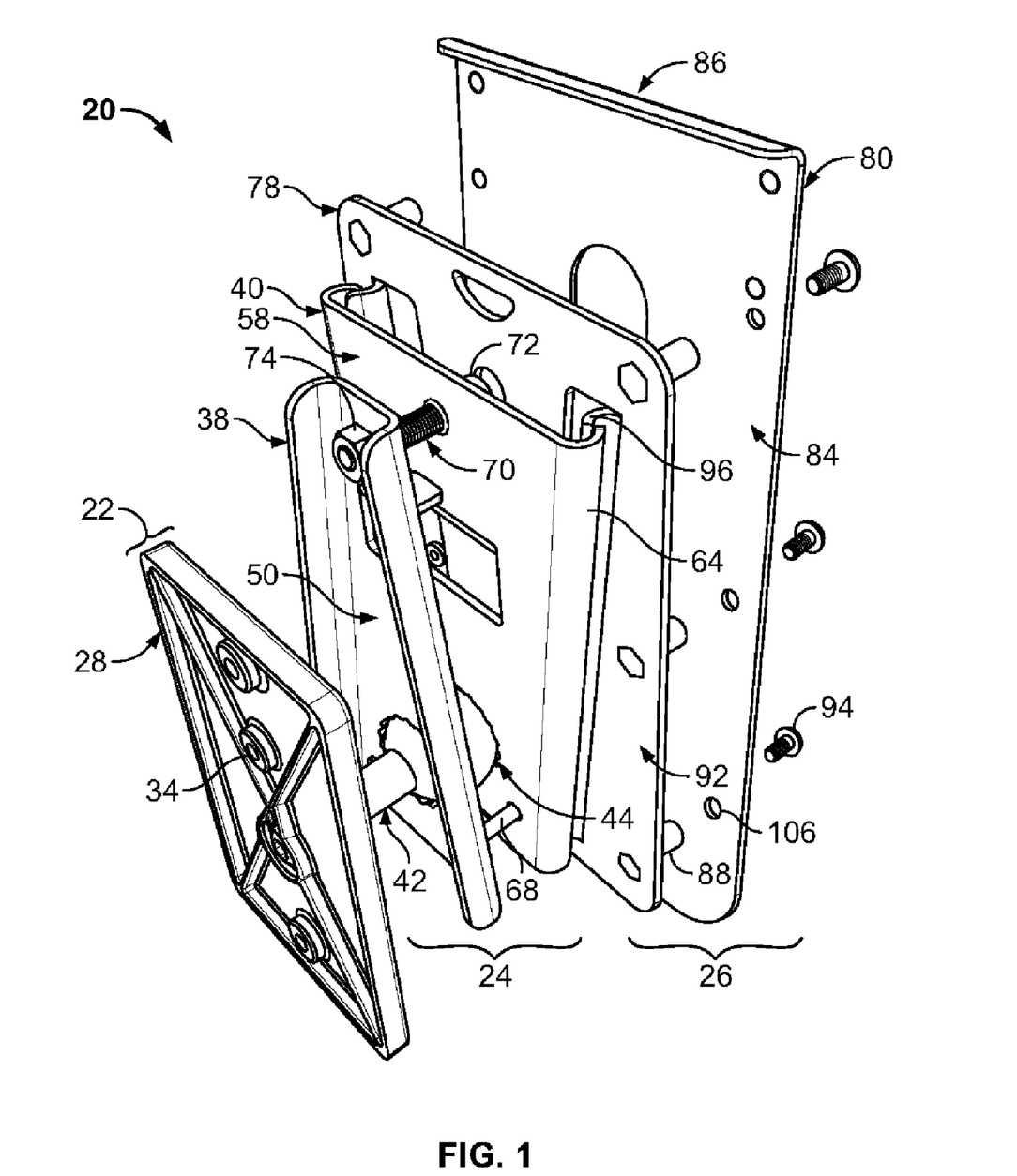
FIG. 1 is a first perspective view of a speaker mount in accordance with the present invention.
Figure 2:
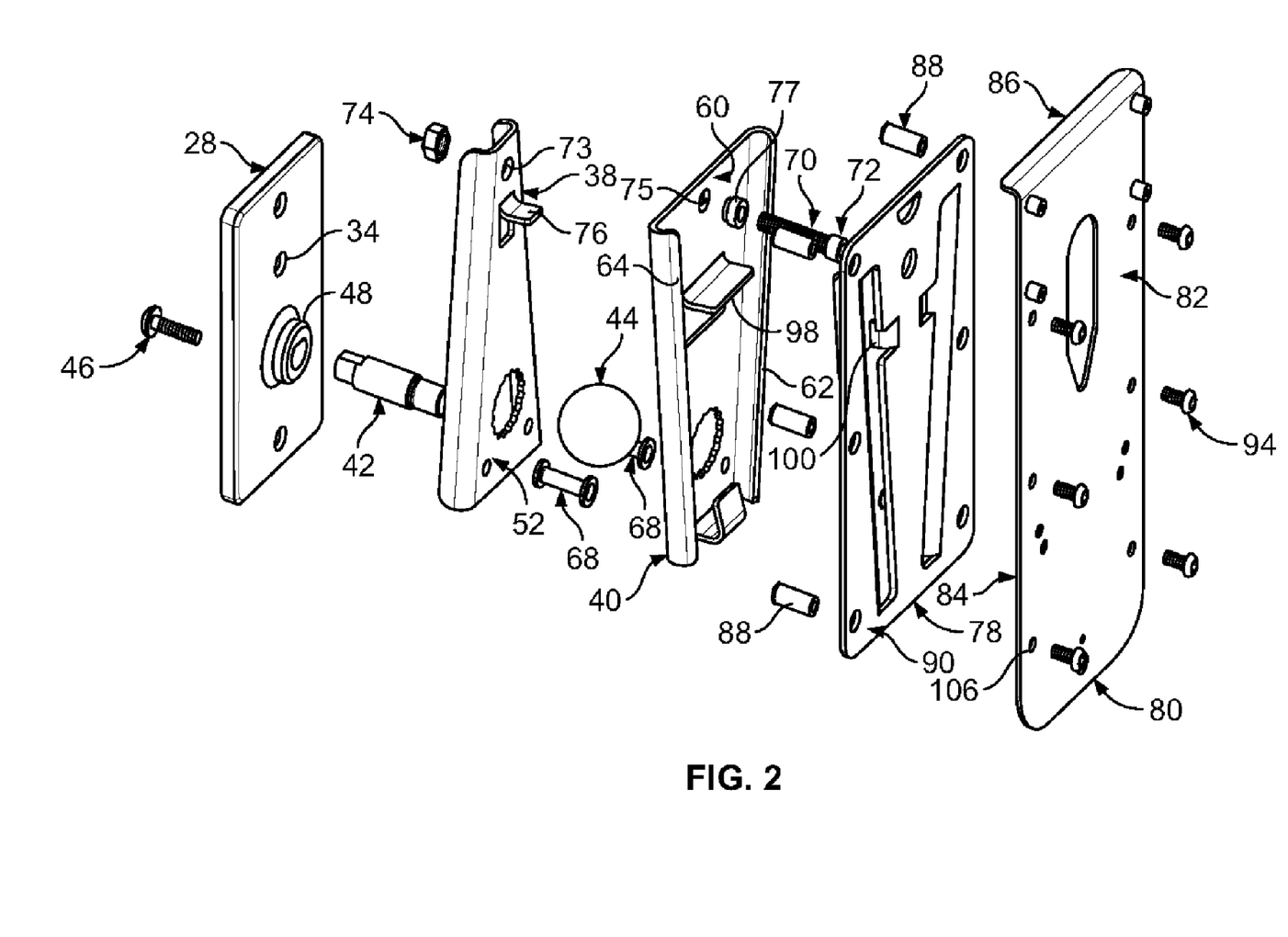
FIG. 2 is a second, exploded perspective view of a speaker mount in accordance with the present invention.
Figure 4:
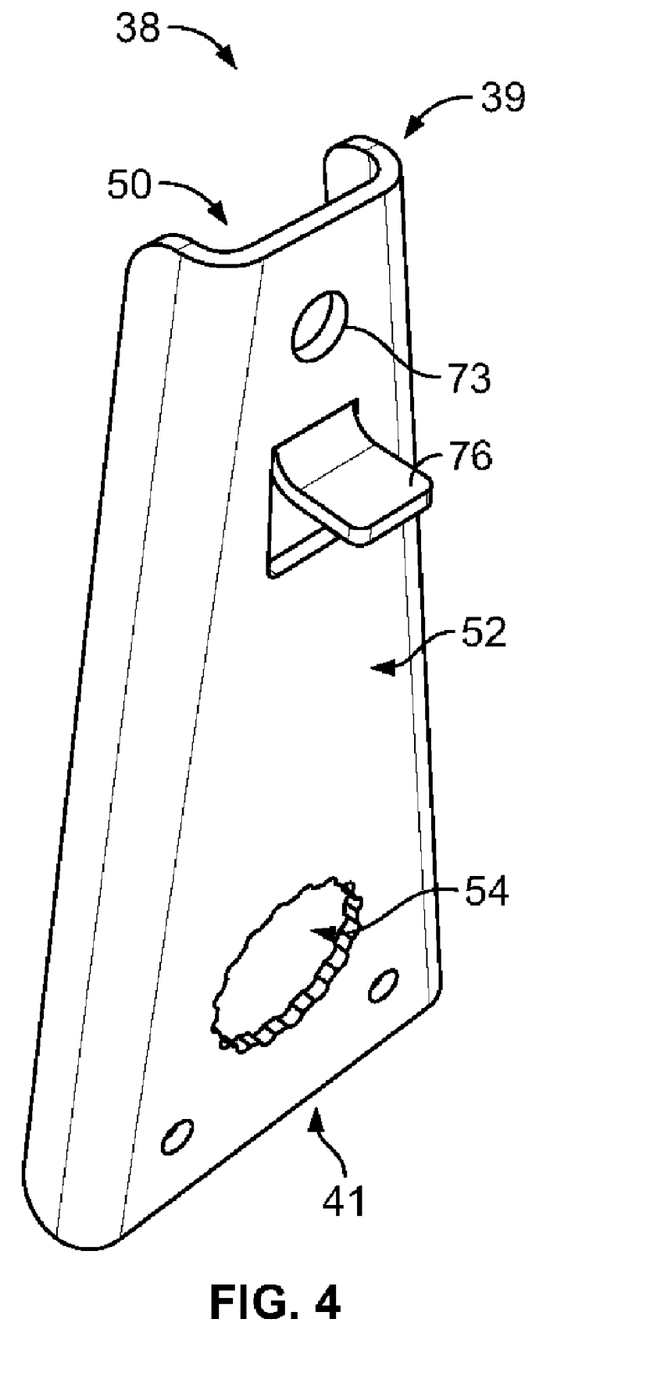
FIG. 4 illustrates a lock plate of a speaker mount in accordance with one embodiment of the invention.

Referring to FIGS. 1, 2 and 4, the lock plate 38 comprises a load-bearing support member. The lock plate 38 may have a variety of shapes and sizes. In one embodiment, the lock plate 38 is "plate-like" in that at least a central portion thereof is relatively thin (compared to it width/length) and planar. As illustrated, the lock plate 38 has a rear face or surface 50 and an opposing front face or surface 52. In one embodiment, the lock plate 38 has a height or length which exceeds its width. For structural integrity, in one embodiment opposing sides or edges of the lock plate 38 are folded or bent out of the plane containing the central or main portion of the lock plate 38, increasing the structural rigidity of the lock plate 38. When the speaker mount 20 is in its preferred embodiment, the lock plate 38 has a top 39 and a bottom 41. In one embodiment, the width of the lock plate 38 at its top 39 is greater than at its bottom 41.

A serrated aperture 54 is provided in the lock plate 38. The aperture 54 preferably has a diameter which is less than that of the ball 44, but which is larger than the maximum cross-sectional dimension of the shaft 42. In this manner, the shaft 42 is permitted to pass through the aperture 54 but the ball 44 is not. During assembly and in use, as detailed below, the lock plate 38 is located over the shaft 42 at a side or portion of the ball 44 which faces or is closest to the bracket 28.

Referring to FIGS. 1 and 2, the first connector or stage 40 is preferably configured to mate or connect to the lock plate 38 in a manner which secures the stage 40 into one or more positions relative to the ball 44, and is also configured to support a speaker through connection with the body support 26.

Figure 5:
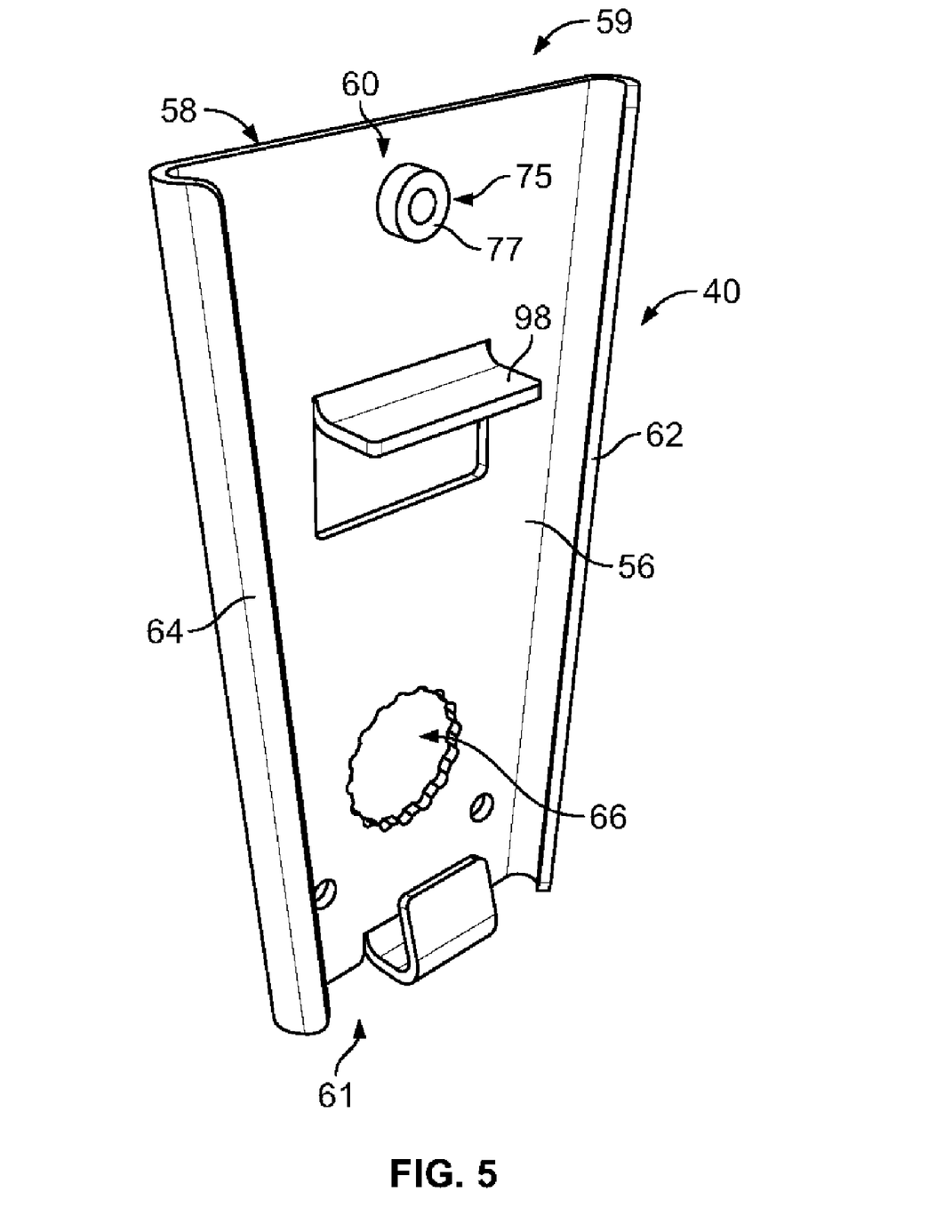
FIG. 5 illustrates a stage of a speaker mount in accordance with one embodiment of the invention.

Referring to FIGS. 1, 2 and 5, the stage 40 has a generally planar central section 56 having a rear surface or face 58 and a front surface or face 60. When the speaker mount 20 is in its preferred orientation, the stage 40 has a top 59 and a bottom 61. In one embodiment, the stage 40 has a height/length which is greater than its width, and a width at its top 59 which exceeds its width at its bottom 61.

In a preferred embodiment, the stage 40 includes means for detachably supporting a body support 26. In one embodiment, the opposing sides 62,64 of the stage 40 are preferably bent in the direction of the front face 60 at a convergence angle. Further, the distance between these opposing sides 62,64 varies. Preferably, the distance between the opposing sides 62,64 decreases generally linearly from a top of the stage 40 towards a bottom of the stage 40. As detailed above, these bent sides or edges of the stage 40 are configured for accepting mating members of a second connector of the body support 26.

A serrated aperture 66 is provided in the stage 40. The aperture 66 is sufficiently large to accept a portion of the ball 44, but not permit the ball 44 to pass there through. As illustrated, in FIGS. 1 and 2, this permits the stage 40 to be located at an opposing side of the ball 44 from the lock plate 38.

Means are provided for selectively fixing or locking the position of the first connector or stage 40 to the ball 44. This means preferably comprises means for controlling a distance between the lock plate 38 and the stage 40. As detailed below, when the distance between the lock plate 38 and stage 40 is increased, these members may be moved relative to the ball 44, thus permitting a change in their orientation, and thus a change in orientation of an associated supported body, such as a speaker. However, when the distance between the lock plate 38 and stage 40 is decreased, the lock plate 38 and stage 40 bind in position on the ball 44, thus effectively locking them into a fixed position relative to the ball. In one embodiment, the hard serrations of the lock plate 38 and the stage 40 engage the softer cast ball 44 to provide a high load resistance positioning capability.

In one embodiment, the lock plate 38 and the stage 40 are mounted to one another. As illustrated in FIGS. 1 and 2, a pair of pins 68 extend between and connect the lock plate 38 and stage 40. In a preferred embodiment, the pins 68 are located near the bottom 41 of the lock plate 38 and the bottom 61 of the stage 40, and below the ball 44 when the speaker mount 20 is assembled. In one embodiment, the length of the pins 68 is selected to ensure that the lock plate 38 and stage 40 maintain their positions on either side of the ball 44 and do not become disassociated from the ball 44. The fixed length of the pins may also be selected to provide the proper engagement of the serrated aperture 66 of the stage 40 and the serrated aperture 54 of the lock plate with the ball 44 when stop 76 of the lock plate 38 is drawn against the stage 40. At the same time, however, the length of the pins 68 is sufficiently great to not so bind the lock plate 38 and stage 40 to the ball 44 that these members cannot be readily moved with respect to the ball 44.

In one embodiment, as best illustrated in FIG. 2, opposing ends of the pins 68 include heads located on opposing sides of the lock plate 38 and stage 40 so as to not permit the removal of the pins or the separation of the lock plate 38 and stage 40. The pins 68 might be connected to these members in other fashions, such as by threads, welding or the like. In the preferred embodiment, the pins 68 are loosely constrained to allow the aperture 54 of the lock plate 38 and the aperture 66 of the stage 40 to self align with the ball 44. The pins 68 are configured to only tightly constrain the lock plate 38 and the stage 40 in the direction of the cylindrical axis of each pin 68.

In one embodiment, means are provided for controlling the distance between the lock plate 38 and stage 40. In one embodiment, this means comprises a threaded fastener 70 which engages these members.

As illustrated in FIGS. 1 and 2, the fastener 70 has a head 72 located at the front face 60 of the stage 40, and is configured to engage the lock plate 38. In one embodiment, a nut 74 is located at the rear face 50 of the lock plate 38, and the fastener 70 engages the nut 74.

In order to prevent the nut 74 from being disassociated from the fastener 70 once the fastener 70 is connected thereto, the nut 74 may be crimped at its opposing side, thus preventing the nut 74 from threading off of the fastener 70. In the preferred embodiment, the nut 74 is resistance welded to the fastener 70. The fastener 70 is configured to tightly constrain the lock plate 38 only in the direction of the cylindrical axis of the fastener 70, allowing the lock plate 38 to self align with the ball 44.

Apertures 73,75 are provided in the lock plate 38 and stage 40, respectively, which permit passage of the fastener 70 there through. These apertures are preferably substantially aligned to prevent binding of the fastener. In one embodiment, a thread insert 77 is mounted to the stage 40 to enable the threaded fastener 70 to pull against the lock plate 38 with the fixed nut 74 when rotated.

In a preferred embodiment, the apertures, and thus the fastener 70, are located at portions of the lock plate 38 and stage 40 which are set off from the pins 68, and are preferably at portions of the lock plate 38 and stage 40 which are opposite the ball 44 from the pins 68. In the preferred embodiment, this means that the fastener 70 engages the lock plate 38 and stage 40 towards their top ends 39,59. In this manner, as detailed below, when the fastener 70 is tightened, the lock plate 38 and stage 40 move closer to one another, pivoting about the ball 44 in a lever effect to bind and compress about the ball 44, thus securing them in position relative to the ball 44.

In one embodiment, as best illustrated in FIGS. 2 and 4, a stop 76 extends from the lock plate 38 towards the stage 40. The stop 76 preferably prevents over-tightening of the fastener 70, as might cause bending or other damage to the lock plate 38 or the stage 40. As illustrated, the stop 76 comprises a portion of the body of the lock plate 38 which is punched out. Of course, the stop 76 could comprise a separate element which is connected to the lock plate 38. The stop 76 could also extend from the stage 40, or pair of members might extend from each of the lock pate 38 and stage 40 which are configured to meet or engage one another. Additional details of the stage 40 will be described below.

The body support 26 is configured to attach to a speaker or other body and mount the speaker to the adjustable support 24. In one embodiment, the body support 26 comprises a body mount and a second connector, wherein the second connector is configured to selectively mate to the first connector of the adjustable support 24. In one embodiment, the second connector comprises a connector plate 78, and the body mount comprises a chassis plate 80.

The body support 26 is configured to be connected to or associated with the body which is to be supported by the mount 20. In an embodiment where the body is a speaker, the body support 26 is mounted to or associated with the speaker.

Figure 8:
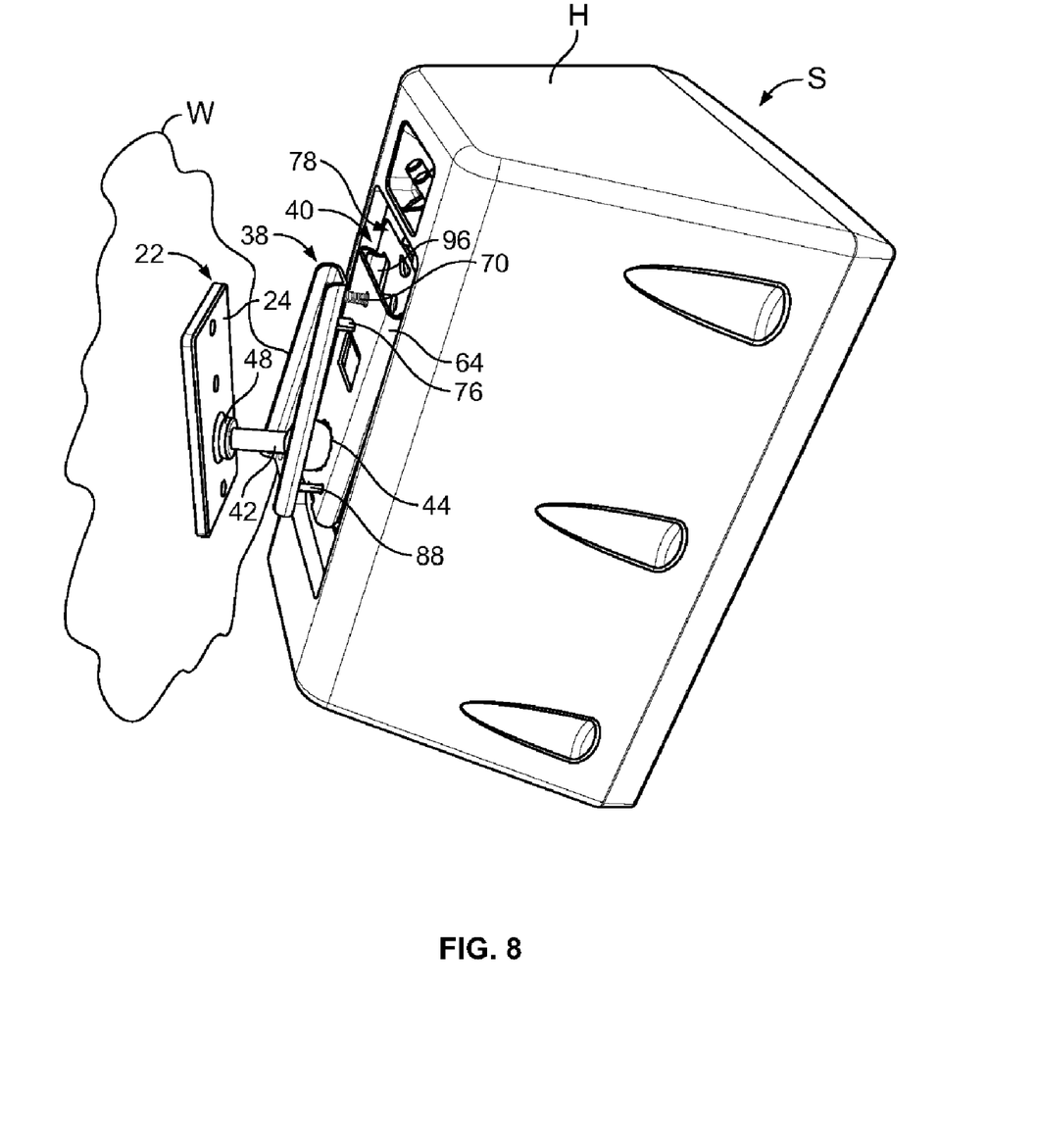
FIG. 8 is a perspective view of a speaker mount of the present invention connected to a support structure and supporting a speaker.

The chassis plate 80 is configured to be connected to a speaker housing. One embodiment of a speaker S is illustrated in FIG. 8. In the preferred embodiment, the speaker S is a loudspeaker. The speaker S has a housing H which enclosed or supports one or more sound generating elements. Such a housing H generally comprises a walled structure defining an interior space. The speaker S may have a variety of configurations, and may thus include one or more diaphragm, electrostatic or horn type sound generating elements, among others.

In the preferred embodiment, the chassis plate 80 is configured to be located within the housing H of the speaker S. As such, in one embodiment the chassis plate 80 is generally planar. Preferably, the chassis plate 80 is configured to be mounted at a rear portion of the housing H of the speaker S, and more particularly, adjacent a rear wall of the housing H.

Figure 7:
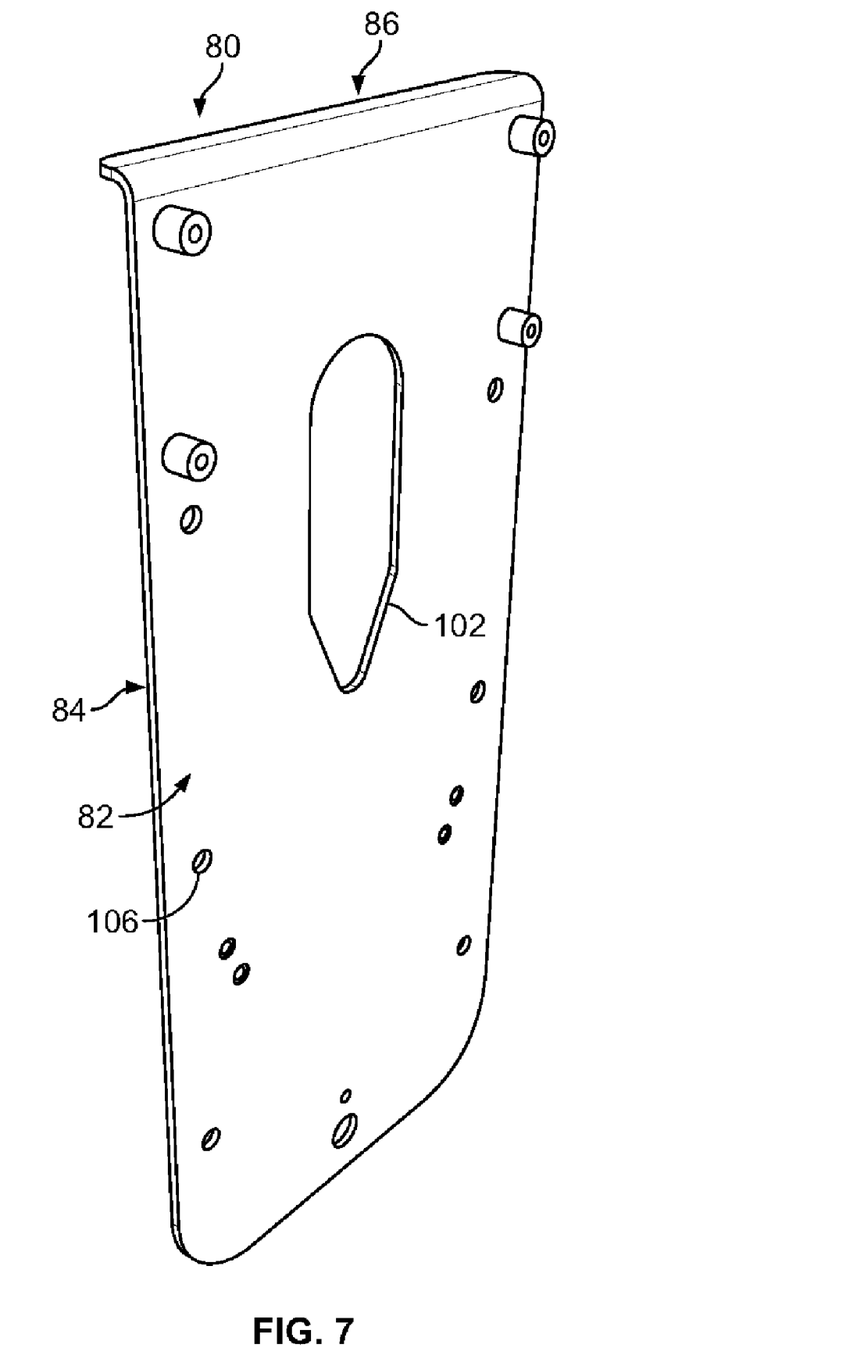
FIG. 7 illustrates a speaker chassis plate in accordance with one embodiment of the invention.

Referring primarily to FIGS. 1, 2 and 7, as illustrated, the chassis plate 80 has a front surface or face 82 and a rear surface or face 84. In order to spread the load carried by the chassis plate 80 relative to the housing H of the speaker S, in one embodiment the chassis plate 80 is approximately as large as the rear wall of the speaker S.

In one embodiment, the chassis plate 80 serves as a support or mount for various components or features of the speaker S. For example, the chassis plate 80 may support a cross-over network circuit board, transformer, one or more switches and/or other components of the switch. In one embodiment, the chassis plate 80 may include a stop bracket 86 extending outwardly from rear face 84. In one embodiment, the chassis plate 80 may include right angle bends extending outwardly from the front face 82 along the long sides to provide stiffness. In this regard, it is noted that the chassis plate 80 may have a variety of shapes and configuration depending upon the configuration of the speaker S with which it is associated.

Referring to FIGS. 1 and 2, the chassis plate 80 is connected to the second connector, which in the preferred embodiment comprises the connector plate 78. The connector plate 78 is preferably configured to be located exterior to the housing H of the speaker S. In one embodiment, the connector plate 78 and chassis plate 80 are set off from one another. The set-off allows the rear wall and/or other components of the speaker S to be located between the connector plate 78 which is located exterior to the housing H and the chassis plate 80 which is located interior to the housing H.

In one embodiment, this set-off is facilitated by one or more stands 88. As illustrated, a plurality of stands 88 extends from a front surface or face 90 of the connector plate 78 towards the rear surface or face 84 of the chassis plate 80. In one embodiment, each of the stands 88 is shaped like a rod or cylinder, having a first end connected to the connector plate 78 and a second end for engaging the chassis plate 80. In a preferred embodiment, apertures (not visible in the figures) are provided in the housing H through which the stands 88 extend.

Means are provided for connecting the stands 88 to the chassis plate 80. In one embodiment, this means comprises one or more threaded fasteners 94. As illustrated, apertures 106 are provided in the chassis plate 80 through which the fasteners 94 may pass into engagement with the stands 88. In one embodiment, as illustrated, six stands 88 are provided and those stands are generally arranged to extend between the connector plate 78 and chassis plate 80 about the peripheries thereof.

Of course, the chassis plate 80 may connect to the stands 88 in other fashions. In other embodiments, other types of spacers may be used to set the chassis plate 80 off from the connector plate 78, such as to permit location of the rear wall of the housing there between.

The connector plate 78 is configured for connection or mating to the stage 40. Preferably, the connector plate 78 can be connected to and disconnected from the stage 40. In this manner, the speaker S can be selectively associated with the adjustable support 24, or be disconnected there from.

Figure 6:
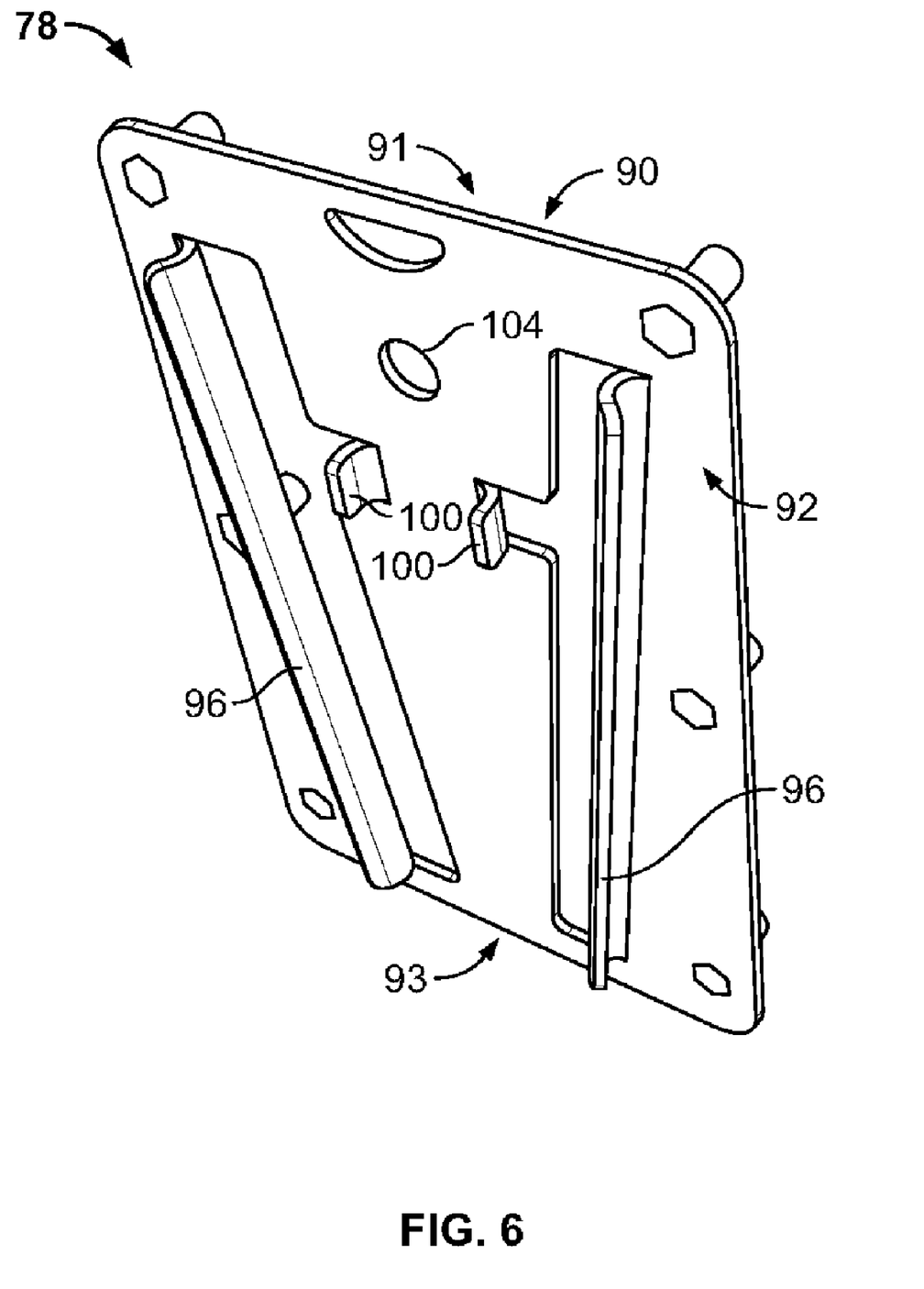
FIG. 6 illustrates a connector plate of a speaker mount in accordance with one embodiment of the invention.

In one embodiment, with reference to FIGS. 1, 2 and 6, the connector plate 78 has a front face or surface 90, and an opposing rear face or surface 92. In one embodiment, the connector plate 78 is generally planar. When the speaker mount 20 is in its preferred orientation, the connector plate 78 has a top 91 and a bottom 93.

The connector plate 78 includes means for connecting it to the stage 40. In one embodiment, a pair of spaced flanges or ribs 96 extends outwardly from the rear face 92 of the connector plate 78 at a diverging angle. In one embodiment, these flanges 96 may be punched from the material which comprises the main body of the connector plate 78.

In a preferred embodiment, the flanges 96 are not parallel to one another. Instead, at or towards the bottom 93 of the connector plate 78 the flanges 96 are closer to one another than they are at or towards the top 91 of the connector plate 78. In one embodiment, the distance between the flanges 96 changes linearly at a rate which is similar to that of the sides 62,64 of the stage 60. The distance between the flanges 96 is preferably such that they may be located within the sides 62,64 of the stage 40 in at least one interlocking position.

In one embodiment, means are provided for selectively limiting the interlocking travel of the first and second connectors (the connector plate 78 relative to the stage 40). In one embodiment, this means comprises the interference between the increasingly spaced flanges 96 of the connector plate 78 and the decreasingly spaced sides 62,64 of the stage 40. Additionally, in one embodiment, a stop 98 extends outwardly from the front face 60 of the stage 40, as best illustrated in FIGS. 2 and 5. As illustrated, the stop 98 may comprise a punched out section of the body of the stage 40. At least one corresponding catch 100 extends outwardly from the rear face 92 of the connector plate 78. As illustrated, two catches 100 are provided, the catches 100 comprising punched out portions of the body of the connector plate 78.

Preferably, the stop 98 and catches 100 are positioned so that the catches 100 rest upon the stop 98 when the connector plate 78 is positioned in engagement with the stage 40, in the manner detailed below.

Assembly and use of the speaker mount 20 of the preferred embodiment of the invention will now be described in detail with reference to FIGS. 1 and 2.

In the preferred embodiment, the chassis plate 80 is located within the speaker S during assembly of the speaker S as a subassembly with mounted components. Before the housing H of the speaker is closed, the connector plate 78 is attached to the chassis plate 80. In the preferred embodiment, the stands 88 are passed through the rear wall of the housing H into engagement with the chassis plate 80. The fasteners 94 are placed into engagement with the stands 88, thus locking the chassis plate 80 in position within the interior of the speaker S, and the connector plate 78 at the exterior of the speaker S.

The ball 44 is placed into engagement with and located between the lock plate 38 and the stage 40. The lock plate 38 and stage 40 are connected, such as by the pins 68 and the fastener 70 combined with the nut 74. In this manner, the lock plate 38 and stage 40 are associated with the ball 44 in a manner preventing them from falling off of or becoming disassociated from the ball 44. The shaft 42 is connected to the bracket 28, such as with an appropriate fastener. The support structure mount 22 and associated adjustable support 26 are then ready for connection to a structure, and the body support 26 is then ready for connection to the adjustable support 24.

The support structure mount 22 is associated with a support structure/surface. In a preferred embodiment, this step comprises connecting the bracket 28 to a support. In one embodiment, the support may be a wall. The support may be other members or elements, such as posts, arches, ceilings and other structures. The speaker mount 20 is particularly configured to mount a body, such as a speaker, to a vertically extending support or surface.

The bracket 28 is positioned adjacent the desired support with the rear face 30 thereof facing the support. In the preferred embodiment, fasteners are passed through the apertures 34 in the bracket 28 and into the support structure. For example, screws or nails may be passed through the apertures 34 and into engagement with the support. To provide secure mounting to a wall, the fasteners may be desirably engaged with underlying studs rather than simply an overlying drywall sheeting.

The adjustable support 24 is preferably oriented so that the "wide" top portion of the stage 40 is oriented upwardly in the situation where the speaker mount 20 is connected to a vertically extending structure or surface. Preferably, the stage 40 is locked into a fixed position so that when a speaker S is connected thereto, the stage 40 does not swivel quickly out of position and result in damage to the speaker S. Thus, in the preferred embodiment, the fastener 70 is tightened, drawing the lock plate 38 and stage 40 towards one another and locking them into place on the ball 44.

The speaker S is then placed into engagement with the adjustable support 24. In particular, the connector plate 78 is located vertically above the stage 40, with the bottom 93 of the connector plate 78 (where the flanges 96 are located closest to one another) located adjacent the top 59 of the stage 40 (where the sides 62,64 of the stage 40 are located farthest from one another). The flanges 96 of the connector plate 78 are aligned with the bent sides 62,64 of the stage 40, and the connector plate 78 is moved downwardly.

In the preferred embodiment, downward movement of the connector plate 78 is limited by interference of the contacts 100 with the stop 98. At this point, the speaker S or other body is connected to the adjustable support 24, and is supported by the structure mount 22, such as illustrated in FIG. 1.

Advantageously, the orientation of the body which is supported by the mount of the invention, such as a speaker S, may readily be changed. Preferably, the user of the speaker mount 20 supports the body, such as by grasping the speaker S with one hand, and then loosens the fastener 70. Once the fastener 70 is loosened, the lock plate 38 and stage 40 can freely move with respect to the ball 44. The user may thus change the orientation of the speaker S or other body, such as by applying force to it in the desired direction. Once the speaker S or other body is in the desired position, the user tightens the fastener 70. This again draws the lock plate 38 and stage 40 towards one another, fixing them to the ball 44.

In the preferred embodiment, access to the head of the fastener 70 is conveniently provided from the front of the speaker S. In particular, a passage may be defined through the housing H of the speaker S. This passage is aligned with the opening or aperture 102 in the chassis plate 80 and an opening or aperture 104 in the connector plate 78. Thus, a user may pass the head of a tool through the passage in the speaker as well as the apertures 102,104 in the chassis plate 80 and connector plate 78, into engagement with the head of the fastener 70. In this manner, the user of the speaker mount 20 may change the position/orientation of the speaker S by accessing just the front of the speaker S.

It is noted that the particular tool which is used to engage the fastener 70 may depend upon the configuration of the head 72 thereof. For example, a flat-head screwdriver may be used when the head 72 is slotted, an Allen wrench may be used when the head has a hex opening, and a star tool may be used with a star opening. Because the tool must reach from the front of the body to the back of the body to engage the fastener 70, a special tool is required enabling access to be restricted.

The speaker mount of the invention has numerous benefits and advantages, including over other speaker mount designs. The speaker mount permits a speaker or other body (such as thin panel video display or other device) to be oriented directly perpendicular to a support structure, such as a wall. In addition, the speaker may be moved in any direction from perpendicular. The total allowable travel or movement of the speaker which is permitted is dependent upon a number of factors, including the size of the speaker S and the length of the stem 42. In a preferred embodiment such as that illustrated in FIG. 2, the speaker S can be moved upwardly at an angle of approximately 20 degrees (before the speaker S impacts the adjacent wall W), and in all other directions by approximately 30 degrees. The speaker mount of the invention thus allows the user to put the speaker in a wide range of orientations by using a single mount.

Another advantage of the invention is the simplicity and efficiency of the design. Advantageously, the connection of the speaker to the adjustable support 24 is external to the speaker S. This allows the design of the speaker to be less complicated, and the size of the speaker to be smaller, since it does not need to contain significant mounting structure elements, as in some designs of the prior art. The external connection of the speaker to the adjustable support 24 reduces the difficulty of placing the speaker in to engagement with the adjustable support 24. In particular, the user can see the first and second connector (in the preferred embodiment, the connector plate 78 and stage 40), since they are both external to the speaker, and thus easily visually align them and place them into engagement.

The speaker mount of the invention also provides a very secure, non-slipping adjustable mount. In particular, the lock plate 38 and the stage 40 both engage the ball 44. As illustrated, the ball 44 fits into a mating circular and serrated apertures 54,66 in both the lock plate 38 and stage 40. The teeth of the serrated apertures 54,66 provide a friction grip on ball 44. Thus resulting in substantial contact area and grip between the plate 38, stage 40 and the ball 44.

The configuration of the lock plate 38 and stage 40 relative to the ball 44, the serration of apertures 54,66 and the means for changing the distance between the lock plate 38 and stage 40, is particularly effective in generating a force which binds the lock plate 38 and stage 40 to the ball 44. As illustrated, the arrangement ensures that the adjustable support 24 remains fixed in position relative to the ball 44 except when the user desires to change the orientation of the speaker S. For example, vibration from wind, gravity and other forces may not cause the orientation of the speaker S to change undesirably.

Another advantage of the invention is the ease with which a user may change the orientation of the speaker S. Though the adjustable support 24 is actually located exterior to (and rear of) the speaker, the user can easily access the fastener 70, e.g., from the front of the speaker, to loosen the adjustable support 24 and change the orientation of the speaker.

Yet another advantage of the invention is that even if the adjustable support 24 is not fixed to the ball 44 or for some reason moves relative to the ball 44, the speaker S will not fall from the mount 20. In particular, the adjustable mounting is separate from the connection of the speaker or other body to the adjustable mount, so the connection of the speaker to the adjustable support is secure and positive, regardless of the position of the adjustable mount relative to the ball and the support structure.

In one embodiment, when the stage 40 is fixed in position, the connector plate 78 cannot be removed therefrom, thus securing the speaker to the mount and preventing its unintended removal. In the preferred embodiment, when the fastener 70 is tightened, thus locking the stage 40 in a fixed position to the ball 44, the head 72 of the fastener 70 backs out in the direction of the connector plate 78, entering the aperture 104 therein. At this point, the connector plate 78 cannot be lifted upwardly relative to the stage 40 and therefore cannot be disengaged.

It will be appreciated that the mount may have a variety of configurations and constructions other than as specifically illustrated. For example, one or more of the components may be constructed in a machining, punching or molding process. Components such as the bracket 28 and shaft 42 or shaft 42 and ball 44 may be constructed as a single element. The components may have a variety of shapes and dimensions and they may be constructed of a variety of materials.

In one embodiment, the body support 26 may be constructed as part of the speaker or body. In such event, for example, the connector plate 78 may be connected directly to the speaker. In another embodiment, the speaker may integrally include a second connector, such as molded flanges or the like, and thus be directly configured to engage the first connector (stage 40). In this regard, a wide variety of speakers may be configured to be attached to the mount. For example, an existing speaker may be fitted with a second connector, such as by attaching flanges to the exterior of the rear wall thereof (or by attaching the connector plate 78 directly thereto), thus permitting the speaker to be connected to the adjustable support.

The first and second connectors may be configured to engage one another in other fashions. For example, the sides 62,64 and flanges 96 may be arranged to be generally parallel and might permit engagement in either direction. For another example, the sides 62,64 and flanges 96 may be replaced by an array of engagement tabs and slots. Various forms of stops may be utilized to maintain the first and second stops in their connected position.

It will be understood that the above described arrangements of apparatus and the method therefrom are merely illustrative of applications of the principles of this invention and many other embodiments and modifications may be made without departing from the spirit and scope of the invention as defined in the claims.

What is claimed is:

1. A mount configured to support a body from a structure in a plurality of possible orientations comprising:
    a structural mount, said structural mount configured to be connected to a support structure;
    an adjustable support, said adjustable support comprising:
    a ball mounted outwardly of and supported by said structural mount, said ball having a first diameter, a first side generally facing said structural mount, and a second side facing generally away from said structural mount;
    a locking member disposed between said first side of said ball and said structural support, said locking member comprising a first aperture having a second diameter less than said first diameter of said ball, said first aperture configured to engage a portion of said first side of said ball;
    and a first connector disposed between said second side of said ball and a body support, said first connector comprising a second aperture having a third diameter less than said first diameter of said ball and configured to engage a portion of said second side of said ball;
    said body support including a second connector configured to be mounted external to a body, said second connector configured to engage said first connector to connect said body to said adjustable support and support said body from said support structure.

2. The mount in accordance with claim 1 wherein said second connector is configured to be located exterior to a housing of said body.

3. The mount in accordance with claim 2 wherein said body is a speaker.

4. The mount in accordance with claim 2 wherein said body support includes an interior support located in said housing, said second connector connected to said interior support.

5. The mount in accordance with claim 4 wherein said body is a speaker and said interior support comprises a secondary support for one or more components of said speaker located within said housing.

6. The mount in accordance with claim 1, further comprising an adjustable threaded fastener for selectively locking said first connector in a plurality of positions relative to said ball.

7. The mount in accordance with claim 6 wherein said threaded fastener extends between said locking member and said first connector.

8. The mount in accordance with claim 1, wherein said first aperture of said locking member comprises a serrated edge.

9. The mount in accordance with claim 1 wherein said second aperture of said first connector comprises a serrated edge.

10. A speaker mount configured to adjustably support a speaker from a support structure in a plurality of possible orientations comprising:
- a structural mount configured to be connected to a support structure;
- an adjustable speaker support, said adjustable speaker support comprising:
- a stem having a first end connected to said structural mount and a ball mounted at a second end of said stem, said ball positioned outwardly of said structural mount, said ball having a first diameter, a first side generally facing said structural mount, and a second side facing generally away from said structural mount;
- a first connector mounted adjacent to said second side of said ball, said first connector comprising a first aperture having a second diameter less than said first diameter of said ball and configured to engage a portion of said second side of said ball;
- and a locking member mounted adjacent to said first side of said ball and connected to said first connector;
said locking member comprising a second aperture having a third diameter less than said first diameter of said ball and configured to engage a portion of said first side of said ball, and
- a speaker attachment, said speaker attachment comprising a second connector configured to be located external to said speaker, said second connector configured to be mated to said first connector to mount said speaker to said adjustable speaker support.

11. The speaker mount in accordance with claim 10, further comprising at least one member configured to adjustably draw said first connector and said locking member towards one another thereby engaging said ball.

12. The speaker mount in accordance with claim 10, further comprising a speaker having a housing and a chassis plate located on an inside of said housing of said speaker, said chassis plate configured to support one or more components of said speaker assembly.

13. The speaker mount in accordance with claim 12 wherein said second connector and chassis plate are configured to be located at opposing sides of a rear wall of said housing of said speaker.

14. Thee speaker mount in accordance with claim 13 wherein a plurality of stands extend between and connect said chassis plate and said second connector, and space said chassis plate and second connector from one another.

15. The speaker mount in accordance with claim 14 wherein said stands pass through said rear wall of said housing.

16. The speaker mount in accordance with claim 10 wherein said locking member and said first connector are fixedly joined in at least one first location.

17. The speaker mount in accordance with claim 16 wherein said locking member and said first connector are adjustably joined in at least one second location.

18. The speaker mount in accordance with claim 17 wherein said at least one first location is in a first direction from said ball and said at least one second location is in a second, generally opposing direction from said ball.

19. The speaker mount in accordance with claim 10 wherein said locking member and said first connector are adjustably joined by a threaded fastener having a head facing in a direction of said speaker.

20. The speaker mount in accordance with claim 19 wherein said second connector has a passage there through aligned with said head of said fastener, whereby a tool may be passed through said second connector into engagement with said head.

21. The speaker mount in accordance with claim 20, further comprising a speaker, said speaker having a passage there through from a front of said housing through said rear of said housing, said passage aligned with said passage through said second connector.

* * * * *